United States Patent [19]

Kulisch et al.

[11] Patent Number: 4,866,653

[45] Date of Patent: Sep. 12, 1989

[54] CIRCUITRY FOR GENERATING SUMS, ESPECIALLY SCALAR PRODUCTS

[75] Inventors: Ulrich Kulisch, 37, Im Eichbäumle, 7500 Karlsruhe; Reinhard Kirchner, Kaiserslautern, both of Fed. Rep. of Germany

[73] Assignee: Ulrich Kulisch, Fed. Rep. of Germany

[21] Appl. No.: 28,644

[22] Filed: Mar. 18, 1987

[30] Foreign Application Priority Data

Aug. 4, 1986 [DE] Fed. Rep. of Germany ....... 3626353
Sep. 9, 1986 [DE] Fed. Rep. of Germany ....... 3630652
Feb. 5, 1987 [DE] Fed. Rep. of Germany ....... 3703440

[51] Int. Cl.⁴ ............................................. G06F 7/38
[52] U.S. Cl. .................................................. 364/748
[58] Field of Search ....................... 364/736, 748, 749

[56] References Cited

U.S. PATENT DOCUMENTS 4,622,650 11/1986 Kulisch ............................ 364/748

FOREIGN PATENT DOCUMENTS 0079471 3/1986 European Pat. Off. .

OTHER PUBLICATIONS

Kulisch, V., Grundlagen des numerischen Rechnens-Mathematische Begründung der Rechnerarthmetik Bibliograph Inst. Mannheim, 1976.

*Primary Examiner*—Gary V. Harkcom
*Assistant Examiner*—Dale M. Shaw
*Attorney, Agent, or Firm*—William D. Drucker

[57] ABSTRACT

Circuitry for the summation, especially for generation, of scalar products, to which one summand in floating-point representation is conveyed per machine cycle (ZT), in which, after conversion into fixed point representation, it is received in a summing unit with an accumulator (AS1,-AS4) comprising the whole exponent range. The accumulator is subdivided into row sections, which are longer than the mantissa of the summands. Partial exponents (EPK1,-EPK4) generated in an exponent analyzer (EXA) control the mantissa positioner (PM) or are allocated to the mantissas and delivered continuously and cycle-wise to transfer registers (RE1-,-RE4; RVS1,-RVS4; RNS1, RNS4), controlling summation row-wise. The carriers are allocated to the accumulator sections and intermediately stored in carry memory sections (CS1,-CS4) and are not added digit positionwise to the contents of each adjacent memory section until the sum is output, further carries being continuously processed. Afterwards the rounded result mantissa (ME) is generated in transfer registers (RA1, RA2, RPR) arranged downstream and the result exponent (EE) is generated in an exponent generator (EXG).

36 Claims, 7 Drawing Sheets

CIRCUITRY FOR GENERATING SUMS, ESPECIALLY SCALAR PRODUCTS

BACKGROUND OF THE INVENTION

The invention relates to circuitry for generating sums, especially scalar products, with a summing unit which, on the input side, is connected via an exponent-controlled mantissa positioner to a multiplication unit which delivers products in floating-point representation, this consisting of a product mantissa, a product sign and a product exponent, and which, on the output side, delivers to an interface via a result positioner a controlled rounded result mantissa and a result sign and via an exponent generator a result exponent, possibly an overflow or underflow flag, the length of an accumulator register of the summing unit corresponding to at least the length of the product mantissa and the difference between the largest and smallest product exponents.

PRIOR ART

From EP-PS 0 079 471 circuitry is known for generating scalar product sums from floating-point numbers, which circuitry contains a fixed point number accumulator whose length corresponds to at least the length of the mantissa of the product floating-point numbers plus a length which corresponds to the difference between the smallest and largest possible product exponents and which contains special or temporal allocators with which the summation into th accumulator of the product mantissas occurs digit position-wise under the control of the product exponents and with which a controllable rounding and conversion of the fixed point sum into a floating-point number consisting of mantissa and exponent occurs together with overflow and underflow criteria. This circuitry has the advantage that the scalar products are generated with maximum accuracy. The disadvantage of this circuitry was, however, that owing to the great length of the accumulator a purely serial temporal allocater had a very long clock cycle time and a parallelly operating allocator required very high expenditure and a carry transfer circuit through all digit positions was practically impossible in one machine cycle time even with carry look ahead.

For this reason such long accumulators in computers of the type which generate one product per machine cycle, that is to say vector computers, were not used. Algorithmic, soft-ware handling, as is known from U. Kulisch: "Grundlagen des numerischen Rechnens-Mathematische Begründung der Rechnerarithmetik-Bibliograph. Inst., Mannheim 1976, ("Bases of numerical computation-Mathematical grounding of computer arithmetic"), of the product sums generated in the way usual in these computers and comprising single or double mantissa length of the predetermined machine numbers, which may serve to prevent errors which arise from the use of a short accumulator, was also not effected owing to the complexity of the algorithms and the need arising in individual cases for several successive register transfers of data in one machine cycle. Therefore, the largest and fastest computers have operated until now without protected arithmetic, as they are at any rate equipped with an accumulator extended by few over- and underflow digit storage cells.

It is also known to divide arithmetical sequential circuits into parallel and independently operating subcircuit units connected in series according to the flow of data, which subcircuit units each perform one operational step in one machine cycle time. In this way a continuous flow of one result per cycle arises after an initial start up time since the first operands supplied, as is the case with vector computers.

OBJECT OF THE INVENTION

The problem on which the invention is based is that of providing economically productible circuitry and a control method therefor, which circuitry contains a fixed-point accumulator comprising the whole number range of the products to be summed and which makes possible the picking up of one product for summation per machine cycle.

SUMMARY OF THE INVENTION

The solution consists in that the multiplication unit feeds one of the products per machine cycle through a product exponent analyzer and the mantissa positioner into an arrangement of transfer register rows operated in equal cycles, control signals from the exponent analyser for the digit value-wise summation of the mantissa being fed to control signal transfer register parts together with the accompanying mantissas positioned inside the mantissa transfer register parts of each transfer register row, and that the control signal transfer register parts are connected with a control unit which controls, dependent on the control signal, the column-wise connection of the transfer register rows and the connection of the mantissa transfer register parts with the inputs of summing unit parts of the summing unit and the connection of the outputs of the summing unit parts with the accumulator sections and the connection of the accumulator sections with the mantissa transfer register parts, so that a digit value-wise summation occurs into these accumulator sections, the carries arising during section-wise summation being intermediately stored in carry registers and carry memory sections, which are arranged with the accumulator sections in the accompanying transfer register rows, and that, controlled via the control unit by a rounding signal fed in on the input side, the contents of the accumulator sections, are summed and output continuously and digit position-wise with the contents of the carry registers.

Advantageous embodiments are given in the sub-claims.

A first embodiment of the circuitry is advantageously so constructed that all accumulator register sections have allocated to them summing unit sections. In this way the circuitry is subdivided into few types of sub-assemblies, so that these can be manufactured and joined together in an economic and highly integrated way, low internal and external signal travelling times arising in and between them.

A control circuit arranged in each of the sub-assemblies themselves results advantageously in a low number of connections between the individual sub-assemblies and short connections with short travelling times of the signals between the sub-assemblies. A further reduction of the total number of connections between the sub-assemblies may be achieved by a combination of several row sections in one sub-assembly, the length and number of these sections depending on the degree of integration to be achieved and the total number of contacts available in a sub-assembly. Division of the row sub-assemblies into transfer register sub-assemblies and summing unit sub-assemblies with the use of combined in- and output connections results in a high degree of integration of the summing unit with low carry travelling times.

A high degree of exploitation of the surface of the circuit wafers is achieved by a preferred use of input multiplexers and thereby a reduction in the number of outputs in the positioner sub-assemblies, this being advantageous because of the relatively low space and power requirements of the inputs.

Similar sub-assemblies are advantageously arranged on the input- and output sides of the summer as positioner sub-assemblies for digit-wise supplying and normalising of the mantissas, the cost of sub-assembly development thereby being kept low.

If a relatively large exponent range, e.g. from +300 to −300, is provided in a computer, the length of the summing unit is then advantageously reduced to something more than half, so that it is provided for the mantissa length of the products and accordingly something more than the exponent ranges of a factor of the product. For the unusual products with larger and smaller exponents an over- or underflow is then signalled, which can initiate special treatment. Such a restricted exponent range is then still superior to that of conventional computers. The protected accuracy of calculation which may be achieved is much higher, however, than when calculation is attempted without this long summer with only a conventional accumulator of double or many times the length and a large exponent range, since accuracy of the final result is not protected by the usual roundings with each individual summation of a product, as is the case with the long summer with additional special case treatment for over- or underflow.

Another advantageous embodiment consists in that the accumulator sections are arranged in rows of a memory which allows simultaneous reading and writing of different, separately addressed memory rows, and the control quantity sections supply the read and write addresses to the memory, and in each memory row carry memory sections are arranged whose capacity is so measured that all overflows of the partial summations of a sum generation arising in the respective accumulator section are received therein, and a final carry summation in which cycle-wise reading-out of the summation result from the memory sections occurs in succession from the memory section content of lowest significance to that of highest significance, the contents of one carry memory section being summed to the contents of the same digit position value of the next accumulator memory section, whereafter there occurs a continuous carry-over process of single carries still arising between the sum sections generated.

In order also to make possible the summation of mantissas into the same accumulator register section in successive cycles, switching paths are provided for direct summation to the intermediate result without its being re-written to and reread from the memory. The reading and writing of a certain row of the memory occurs each time staggered by two cycles, the row address of the information always remaining in a transfer register of the information before and after summation. Three addresses and three pieces of information are, as long as they are not the same, independent of each other in the transfer registers.

In order to make possible the summation and storing of mantissas located in any digit position in the accumulator register, without the memory having to be multiply read and written to, the accumulator rows are divided into subsections and the row lengths are selected to be the same as the mantissa length plus the subsection length, each subsection having allocated to it its own overflow memory section. The addressing of the subsections occurs specifically to each, so that appropriately the subsections of all the rows are combined in columns in one partial memory.

In a third advantageous embodiment the accumulator register is arranged in memory sub-assemblies, whose memory cells are very simple in structure, as in this memory arrangement memory row sections which are not different are read and written simultaneously. These simple, conventional memory cells can be designed for higher speeds using the same production process techniques, as the second address decoder is dropped and read malfunctions are prevented by simultaneous writing in another row. In this way the highest operational speed is attained in accordance with the respective state of memory technology. So that with memories of the above type one summation process is possible per read or write cycle two identical memories are provided which are alternately read or written as long as products are to be accumulated. In each of the two memory groups there arise a partial sum and an accompanying carry sum of the same digit value, which are summed together and with the corresponding carries during reading out of the result for rounding and output. A noticeable time loss does not occur at this point, as both partial sums and the accompanying carries are read out in parallel.

DESCRIPTION OF THE PREFERRED EMBODIMENTS

Figure 1:
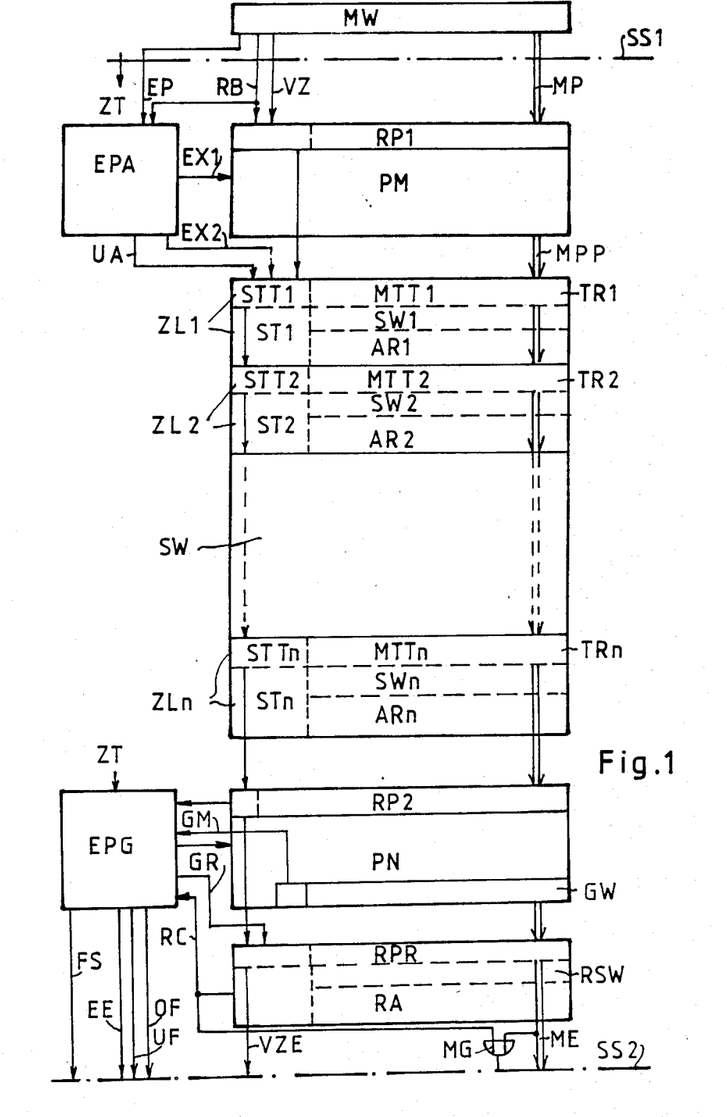
FIG. 1 shows a block diagram of first embodiment of the whole device.

FIG. 1 shows an input interface (SS1), via which summands from a multiplication unit (MW) arranged upstream are transferred to the summing device, which summands consist of a product exponent (EP), a product sign (VZ) and a product mantissa (MP) in magnitude representation. Furthermore, to terminate each series of products, which represent a scalar product, a rounding command (RB) is presented which triggers various control functions, namely to empty the summing unit, to normalize and to round, after the termination of which the rounded result, consisting each time of a result sign (VZE), a result exponent (EE), a result mantissa (ME) and an over- and underflow flag (OF, UF), is delivered, together with a ready signal (FS), to the master computer via an output interface (SS2).

The product exponent is separated into two components in an exponent analyser (EPA), the lower order exponent component (EX1) being conveyed to the input-side mantissa positioner (PM) as a control quantity and the higher order exponent component (EX2) acting as a summing unit control quantity and for this purpose being conveyed, allocated each time to the positioned product mantissa (MPP), to the summing unit (SW), which is divided into several rows (ZL1, ZL2, ... ZLn), for row selection control by means of a control unit (ST1, ST2, ... STn) present in each row. The individual rows (ZL1, ZL2) are of a length which is at least equal to the length of the product mantissa and is preferably larger than this. Each row consists of a transfer register (TR1, TR2, ... TRn). These transfer registers are each connected together in columns from row to row and from output to input as parallel shift registers and serve to transport in cycles and to make available the mantissa in mantissa transfer register positions (MTT, MTT1, ... MTTn) and the accompanying control quantities in control transfer positions (STT1, STT2, ... STTn). Furthermore, the rows contain the corresponding summing unit parts (SW1, SW2, ... SWn) and summing register parts, namely the accumulator register (AR1, AR2, ... ARn) and the row-wise carry and characteristic processing logic, which enable the processing of these corresponding signals within one machine cycle. The maximum line lengths thus result from the row length, and from row to row the signal sources and drains are immediately adjacent. As the control quantities are also forwarded in cycles from row to row, no heavily loaded or distorted bus lines which cause signal delays are present in the column direction. The local control devices in the summing circuits receive position identification signals, which correspond to the row address and position in the row, whereby the summing unit control quantities, which are given in the transfer register positions, are evaluated, so that in each prestored row and position a summation of the mantissa takes place.

Processing of the carries from row to row takes place constantly cyclically within a machine cycle (ZT) in the same direction as the transfer of the mantissa, since the rows increase in digit value in the transfer direction.

If at the end of a summation the rounding control quantity (RB) is predetermined gradually each time by the interface (SS1) together with the respective row flag in continuous sequence in all corresponding rows, then in this cycle there occurs the evacuation of the result from the accumulator (AR1, AR2, ... ARn) into the transfer register (TR1, ... TRn), whence it is transferred cycle by cycle to a result positioner (PN). It is advantageous for an indicator of the highest valid digit position to be tranferred each time together with the result in the control quantity transfer positions (STT1, ... STTn), which indicator is combined with the number of blank highest-order rows, which is determined on transfer of the result from the number of cycles required for their transfer, in an exponent generator circuit (EPG) which conveys a low-order part to the result positioner (PN) as control quantity and on the other side delivers the result exponent (EE) to the interface (SS2). Furthermore, the exponent generator circuit contains overflow and underflow test circuits, as known from the prior art, which deliver corresponding signals to the output interface (SS2).

The positioned result part of the highest order is delivered to the rounding summing unit (RSW), which contains at least the result mantissa (ME) and a lowerorder rounding position and an overflow position. The rounding summing unit (RSW) has a rounding accumulator (RA) with a test circuit which, depending on whether a rounding carry arises, delivers a correcting signal (RC) to the exponent generator to increase the exponent and to an OR-gate (MG). This latter delivers a "one" to the interface at the highest digit position of the result mantissa, the other mantissa digit positions in this case always being zero.

The positioners (PM, PN) each contain appropriately an input register (RP1, RP2), just as in the rounding summing unit (RSW) there is provided an input-output register (RPR), so that a complete cycle time is available for processing, i.e. positioning or rounding. As soon as a result is output to the transfer register, the enable signal (FS) is delivered to the output interface (SS2), which causes the intake of new products from the multiplication unit.

The positioners (PM, PN) and the rows (ZL1, ZL2 ...) of the summing unit (SW) are divided into row sections, known as sub-assemblies, because of the large number of connections, which row sections are interconnected in columns. Carry-processing signal lines are arranged between the sub-assemblies of the summing unit in the direction of the rows. The control quantities are each advantageously conveyed from column to column, for which reason every sub-assembly has its own control quantity transfer register positions. It is thereby possible simultaneously to prestore different control quantities in the various sub-assemblies of one row, which makes it possible simply to deliver a mantissa, after its positioning and especially also when it has been annularly repositioned beyond the row boundary, to the transfer register of the first row, the next row address of a corresponding flag allocated to the part of the mantissa displaced digit-valuably beyond the row boundary as part of the control quantity for sum generation being delivered therewith to the transfer register. The rows of the summing unit are longer than the mantissa by so many positions that the unique allocation of each row section, provided with its own control quantity, to a mantissa section positioned in any manner and to be summed in the designated summing unit section, that is even an initial or end section, is possible, that is to say that no overlapping of beginnings and ends arises in a summing unit section.

For example, a summing unit, which is provided for 20 overflow digits, 28 mantissa digits and twice 128 digit positions for exponent-suitable positioning, can be subdivided into 8 rows each with 5 row sections with 8 digit positions each. The shortest possible total length of the summing unit amounts to 304 digit positions. The 28 mantissa digits are to be allocated in each position uniquely to the sections and a row. Carry processing in a row occurs along the five sections with altogether 40 digit positions, preferably in a single machine cycle.

The same shortest possible total length of 304 digit positions can also be advantageously subdivided, however, into 10 rows of 4 sections, each row having a total of 32 digit positions, each sections, however, being divided into two subsections of 4 digits so that the 28 mantissa digits are allocated uniquely to the subsections. The control quantity of a section is thus each time the row address belonging to the mantissa part and a subsection flag (UA) for the second subsection, if this latter was positioned displacedly beyond the row boundary and is thus to be summed in a following row. In the case given a carry process has to be effected over only 4 sections with 32 digit positions, which saves comparatively on signal travelling time and contacts for signal transfers between the sections, but requires more row cycles, namely 10 instead of 8, for running during result reading.

If additional transfer registers are provided, which are connected on the input side parallel to the mantissa transfer registers, but are loaded with a read signal for result take-over, which read signal is generated by the rounding control quantity which is assigned to the last product of a scalar product to be summed, and are controlled separately for result transfer, there then occurs with each last partial summation in a row the unloading of the result into this result transfer register, whereby the generation of the next scalar product can occur immediately in the next machine cycle. However, the lowest possible number of cycles for generating a scalar product corresponds to the number of rows, since otherwise overlapping of several scalar products would occur.

These result transfer registers are appropriately arranged in separate sub-assemblies, which makes possible the retention of the number of outputs on the summing unit sub-assemblies.

Figure 2:
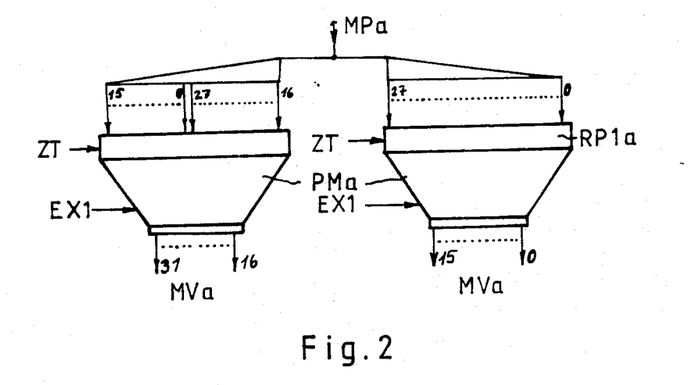
FIG. 2 shows a sub-assembly of the input positioner.

The circuit of the input positioner (PM) can be constructed as a shift register arrangement or as an allocator. An advantageous embodiment of a single-stage allocator is shown in FIG. 2. Because of the generally restricted possibility for accommodating in- and outputs on one sub-assembly, several of the sub-assemblies shown are connected in parallel.

The inputs are additionally connected staggered by a number of contacts corresponding to the position of the respective sub-assembly, in the example namely 16. In the example it is assumed that there are 4 bit positions per digit, so that it is intended that the arrangement of FIG. 2 be present in quadruplicate; that is to say that for each bit position value within one digit there is a multiplexer arrangement of 28 inputs to 32 outputs. Each of the positioner arrangements of one digit is additionally divided into two similar multiplexer sub-assemblies (PMa), to which each output signal of a register (RP1a) is supplied, each with one clock cycle (ZT), in the normal sequence corresponding to the wiring or staggered by 16 positions in the second module. The allocation of the inputs to the multiplexer outputs (MVa) is controlled by the lower exponent control quantity (EX1), which comprises 5 bits, for example by means of a series connection of five rows of selection gates. Correspondingly, a division into four sub-assemblies or only one sub-assembly per position value can occur in one digit, which with an equal number of inputs results in 8 or 32 outputs respectively. The choice of row length as a binary value, e.g. 32, simplifies the construction of the multiplexer and the generation of the lower exponent part (EX1) as well as row identification with the upper exponent part (EX2) and position identification of the mantissa position of the highest order.

Figure 3:
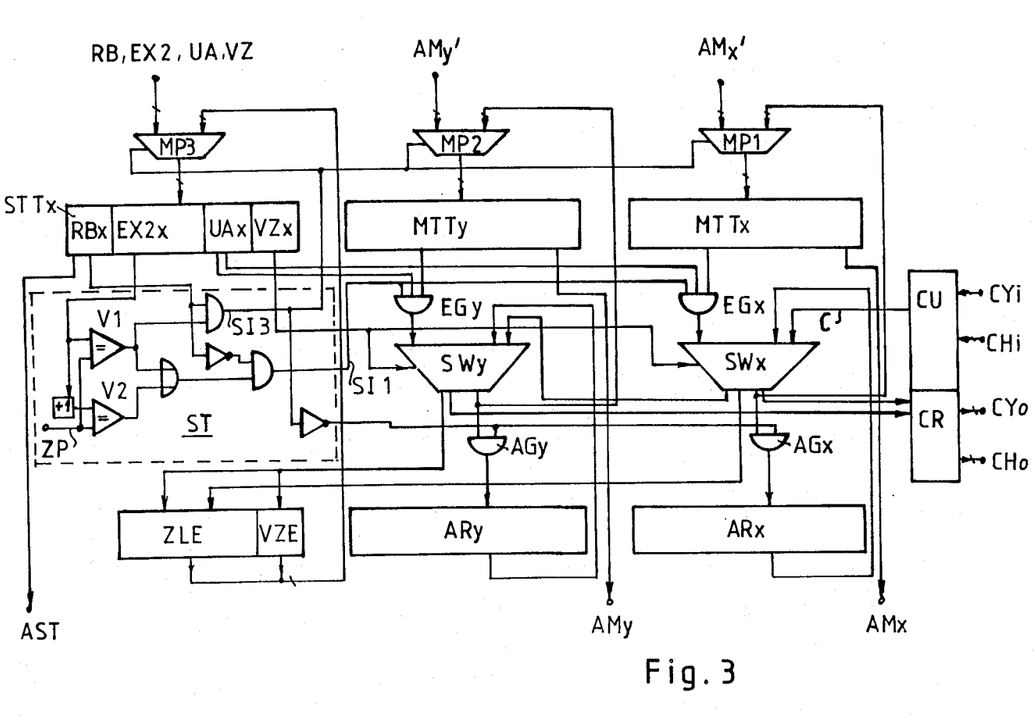
FIG. 3 shows a sub-assembly of the summer.

FIG. 3 is a diagrammatic representation of an embodiment of a sub-assembly of the summing unit wherein especially the row- and column-wise interconnections may be seen.

The mantissa transfer register is divided within the sub-assembly into two subsections (MTTx, MTTy), and the control signal transfer register (STTx) is divided into a rounding command section (RBx), a flag section (UAx) to receive the subsection control flag or the result position indication, an exponent section (EX2x), which picks up the upper exponent section for row selection, and a sign section (XZx). The transfer register sections have output buffers which are connected to the next row via output connections (AST, AMy, AMx). On the input side of the transfer register sections there are located mulitplexers (MP1, MP2, MP3), which are connected by first inputs with the lower-order row or the positioner or exponent analyzer and by second inputs with the accumulator register (ARx, Ary) via the summing unit (SWx, SWy) or with signal sources inside the sub-assemblies and which are each switched over to the second signal inputs with a read-out control quantity (SI3).

The exponent section (EX2x) is brought together in a control device (ST) in a first comparator (V1), which on the other side is acted upon by a row position signal (ZP) which is coded for example at input terminals. Furthermore, in a second comparator (V2) there occurs a comparison of the exponent section (EX2x) with the row position signal (ZP) increased by one. The two comparison output signals are united in one OR-gate and, moreover, are combined with the negated rounding signal (RBx) in an AND-gate into a control signal (SI1) and are connected with the flag signals (UAx) in such a way that correspondingly the summing control signals are generated for input-side connection of the one or the other mantissa transfer subsection (MTTx, MTTy) with the appropriate summing unit section (SWx, SWy) via input gates (EGx, EGy) and summation occurs. At the same time the sign position (VZx) controls the summing process accordingly.

The number of flag positions (UAx) necessary for control depends on the division of the rows into sub-assemblies and the ratio of the row length to the mantissa length. If an exponent section (EX2x) increased by one is allocated to the mantissa part displaced beyond the row boundary, one flag is sufficient, in the present example, for the simultaneous existance of both mantissa ends in one sub-assembly.

If a rounding signal (RBx) is present and there is equality between the exponent section (EXx) and the position, the read-out control signal (SI3) is delivered, which simultaneously inhibits re-storing of the accumulator contents by means of a gate arrangement (AGx, AGy) and erases said contents.

The carry processing circuit (CU) receives the incoming positive and negative overflow signals (CYi) and the zero (i.e. logic zero) and non-zero (i.e. logic one) signals (CHi) of the sub-assemblies of lower-order positions in the same row and of the position lower by one of the adjacent row, that is the row carry, and delivers a carry signal (C) thus generated to the summing unit.

The corresponding output-side carry and carry control signals (CYo, CHo) are each intermediately stored in an output register (CR) for the next cycle time and delivered to the connections of the higher-order sub-assemblies, whereby carries already sent through by means of a carry control signal are not delivered a second time.

From the output of the summing unit sections (SWx, SWy) preparation for read-out via the control quantity transfer positions is effected by a test circuit (ZLE), which encodes the position of the highest-order digit position within the sub-assembly, whose content is unequal to zero or unequal to the highest-possible digit or unequal to the content of the digit position of the next higher order. Furthermore, information as to whether the highest digit position has the highest possible value is made available for output in a status bit, and a flag, e.g. a one, is delivered to the flag position with a result output, which flag aids the identification of the results, when they are transferred further, by the control units (STx) of subsequent rows, such that although more carry processing occurs the result sections are fed to the result positioner otherwise unchanged.

Because of the large number of column-wise connections from sub-assembly to sub-assembly (in the example given there are 80) and the low number of carry connections within a row, it is advantageous with higher integration to combine several row sections of adjacent rows, e.g. two, in one sub-assembly.

Figure 4:
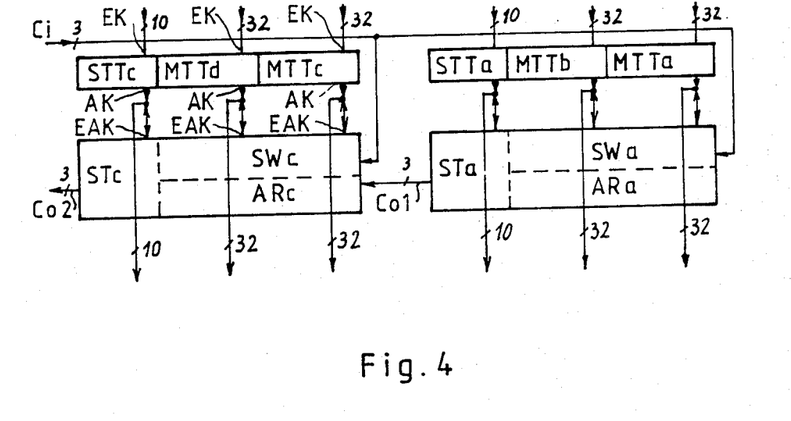
FIG. 4 shows a row with separate summing unit and transfer register sub-assemblies.

Another type of sub-assembly subdivision in the rows is achieved by separation of the transfer register from the summers. In FIG. 4 such an arrangement of a row is shown diagrammatically. The numbers at the oblique strokes through the lines indicate the variety of connections in the example taken. The mantissa transfer registers (MTTa, -MTTd) can each be subdivided according to the possible number of contacts, as can the control signal transfer registers (STTa, STTc), into sections, e.g. 6. The control signal transfer registers have one input contact (EK) and one output contact (AK) per column connection. The summing unit sub-assemblies, which contain the local control unit (STa, STc), the partial summing unit (SWa, SWc) and the partial accumulator (ARa, ARc), have, however, only one internal switchable input and output contact (EAK1) per column, which is connected to the column connection. The outputs of the transfer register (AK) and the outputs of the summing unit (EAK) form a wired OR-circuit. This stops superposition of signals during controlled output from the accumulator, even if the transfer register is not then inhibited on the output side, since no product mantissa is then contained in the transfer register. As long as the line travelling times allow it, it is also possible and simplifying to arrange only one control signal transfer register (STTa) between the two summing unit sub-assemblies and to feed the signals to both summing unit sub-assemblies.

In this way carry processing over a half row can be carried out directly on a sub-assembly substrate with the smallest time loss and without intermediate contact connections and with less gate expense. Thus the number of carry contacts (Ci, Co1, Co2) and lines needed for carry processing is reduced.

Obviously sections of several different rows can also be combined in one sub-assembly with only a slight increase in the number of contacts.

If the rounding summing unit (RSW), FIG. 1, is constructed of the same sub-assemblies as the summing unit (SW), these are appropriately triggered by a suitable presetting of the control quantities (GR) from an external rounding control circuit, which is part of the exponent generator (EPG), to sum or output the result. The process of rounding and over- and underflow generation occurs according to the known specifications, after the result mantissa, oriented to the highest digit position, has been brought into a predetermined position and stored in the rounding accumulator (RA). If the result mantissa extends in the summing unit (SW) beyond a row boundary, the row content, which follows the row with the highest-order digit position, is also forwarded by the same number of digit positions as the first, only the higher-order digit positions, which are positioned beyond the row boundary, being conveyed through corresponding inhibition gates (GW) to the rounding summing unit (RSW). The lower-order digit positions, however, are only tested for the presence of low-order digit positions, which is signalled to the control unit by a low-order reply signal (GM). This signal is combined with the encoded flags, which deliver the state of the subsequent lower-order rows, to control rounding. According to the type of rounding the transfer of all the rows must therefore take place first, until the result can be determined and its delivery to the interface occurs.

The exponent generator (EPG) contains comparators with an upper and a lower boundary value for the result exponent, which is formed from the row number of the row containing the highest valid digit of a result and the position of this digit within the row. When said values are exceeded or fallen short of respectively the exponent generator (EPG) delivers the overflow signal (OF) or the underflow signal (UF) respectively.

As complete scalar product generation generally comprises a relatively large number of summations, e.g. 1000, it is also possible to effect result positioning and rounding in a microprocessor. This can, however, lead to delays in certain calculations with lower numbers of summands.

If separate output transfer registers are provided it is possible to feed in the rounding flag in only one cycle, which follows the supply of the last summands to the input transfer register. Reading-out then occurs independently of row address information and in succession from the lowest- to the highest-order row.

Final carry processing always occurs following the last summation and even in the least favourable case still within the last cycle, in which read-out occurs. At the same time, as no further summand is supplied, only the last carries to arise have to be processed by the row carry circuit. The carries which arise during a summation in a section of a row taking into consideration the carries which have arisen in the preceding cycle in lower-order sections of the row are intermediately stored for processing in the next cycle, for which purpose the carry register (CR) is provided, (FIG. 3). If no further summand is supplied in the following cycle carry processing is thereby completed. Carry processing is thus temporally two-staged, processing occurring within the sub-assemblies during summation and then in a row in the subsequent cycle, possibly overlapping with the next summation.

Similarly, with very long rows multi-cycle arry processing can be provided, the number of cycles being as low as possible, however, so that the number of intermediate cycles necessary between the last summation and the reading-out of the result remains relatively small.

Figure 5:
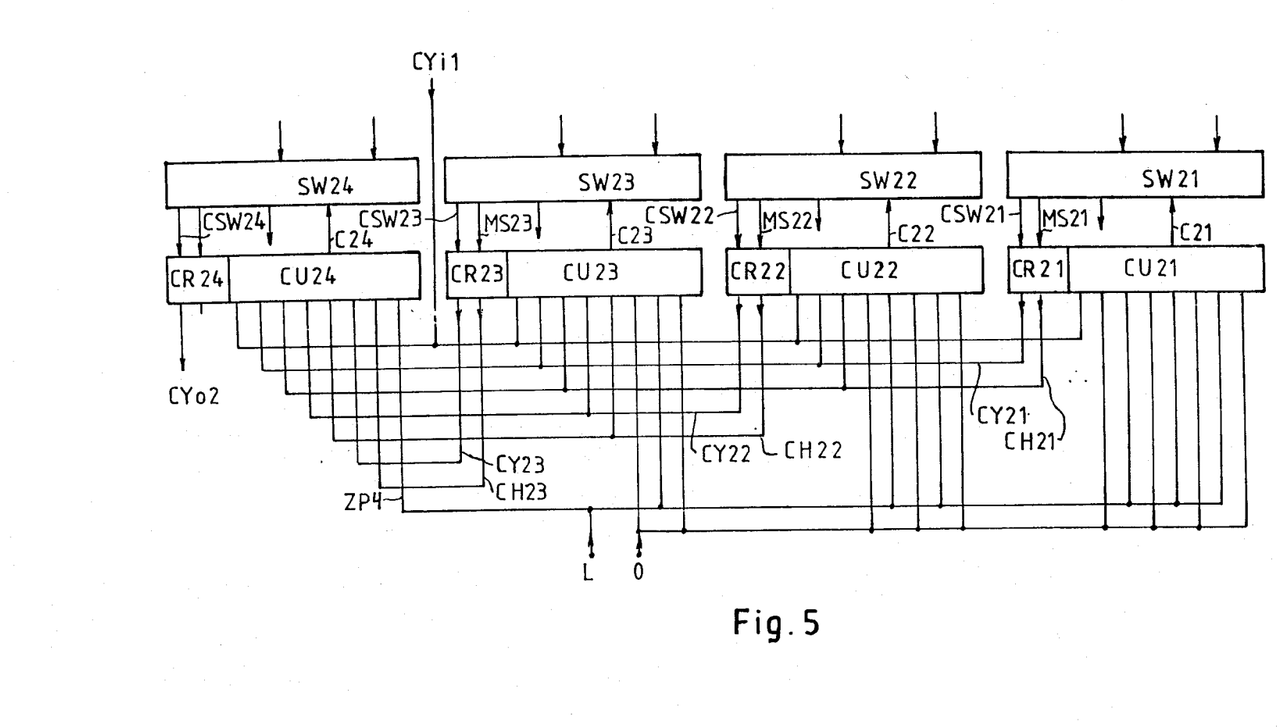
FIG. 5 shows the carry processing connections in one row with four sub-assemblies.

FIG. 5 shows an interconnection of the carry circuits to obtain a, e.g. positive, type of carry-over in a row consisting of sub-assemblies according to FIG. 3. For the second type of carry-over a similar network is present. In the reference numerals the row 2 is given each time. The spacial arrangement is not taken into account for the sake of clarity. The reference numerals increase with the value of the digit positions from sub-assembly to sub-assembly. At the connections signal names are indicated, whose logical operations are shown in the following Table.

TABLE 1

1. $CYi1 = C21$
2. $CSW21 \& (C21 \& CH21)N \rightarrow CY21'$
3. $MS21 \rightarrow CH21'$
4. $CYi1 \& CH21 + CY21 = C22$
5. $CSW22 \& (C22 \& CH22)N \rightarrow CY22'$
6. $MS22 \rightarrow CH22'$
7. $CYi1 \& CH21 \& CH22 + CY21 \& CH22 + CY22 = C23$
8. $CSW23 \& (C23 \& CH23)N \rightarrow CY23'$
9. $MS23 \rightarrow CH23'$
10. $CYi1 \& CH21 \& CH22 \& CH23 + CY21 \& CH22 \& CH23 + CY22 \& CH23 + CY23 = C24$
11. $CSW24 \& ZP4 \rightarrow CYo2'$ In the carry processing circuits (CU21–CU24) the carry signals (C21–C24), which are supplied to the summers (SW21–SW24), are each generated from the inflowing carry signals (CYi1; CY21–CY23) and the propagate signals (CH21–CH23). Herein occurs the summation to the accumulator content and possibly a supplied operand. The summing carries (CSW21–CSW23) arising at this point are each combined in the carry processing circuits (CU21–CU23) in an AND-circuit with an inhibiting signal, which is formed through negation of an AND-operation from the respective carry signal (C21–C23) and the propagate signal (CH21–CH23) of the sub-assembly. In this way double processing is prevented. The signals generated in this way (CY21'–CY23') are stored with the next clock pulse in the carry register (CR21–CR23) and then further processed. In the highest-order digit position sub-assembly the summing unit carry (CSW24) is driven directly by a fixed signal at a position flag input (ZP4) into the carry register (CR24) and stored as a row carry (CYo2') for the next cycle, since no further feeding of lower carries to the next row occurs.

Table 1 contains the equations of the logical operations as well as the cyclically controlled transitions, which are represented by an arrow. The signal names are each provided in the following period with an apostrophe. The detail "N" indicates negation. An "&" indicates a logical AND-operation and "+" an OR-operation. The propagate signals (CH21'–CH23') arise each time from maximum signals (MS21–MS24) occuring in the summing unit, which maximum signals indicate for the propagation of a positive carry that all the positions have the highest digit as their result. This signal is intermediately stored in the carry register by the clock pulse.

As it is assumed that all the sub-assemblies are similarly constructed, left-over inputs are appropriately connected to fixed signals "one" or "zero". The corresponding terms are left out of the table.

If with a given embodiment of the circuit carry processing according to Table 1 additionally represents a time load for the summation processes, it is advantageous to generate the signals for carry propagation (CH21–CH23) and their pre-signals (MS21–MS23) only at the time of the last summation before the processing of the carries and the reading-out of the result. Control can be achieved via the inputs of the sub-assemblies, which serve to convey the position signal (ZP4).

A further variant of carry processing consists in a carry-look-ahead circuit being supplied not by the summing unit section but by the accumulator register section, to which carry-look-ahead circuit there are fed, moreover, the positive and negative carry and look-ahead signals arising in the lower-order sub-assembly, these signals being simultaneously conveyed to the summing unit.

The carry-look-ahead circuits generate carry-look-ahead signals, which are each delivered to the higher-order sub-assembly. The carry signals, which are, as usual, generated in the summing unit sections, and the look-ahead signals are supplied to the corresponding summing unit inputs independently of each other, so that carry summation can range altogether between +2 and −2. Accordingly, the carry-look-ahead circuit always delivers to the next higher sub-assembly a positive look-ahead signal when the content of the accumulator section has the highest possible value and at least a positive, i.e. increasing, carry or a positive, i.e. increasing, look-ahead signal enters or when the content of the accumulator section is smaller by one than the highest possible value and a positive, increasing, carry and a positive, increasing look-ahead signal enter. The same is true for the generation of the negative, i.e. decreasing, look-ahead signal, when the content of the accumulator section is zero or one and one of the negative carry or look-ahead signals or both enter.

Figure 6:
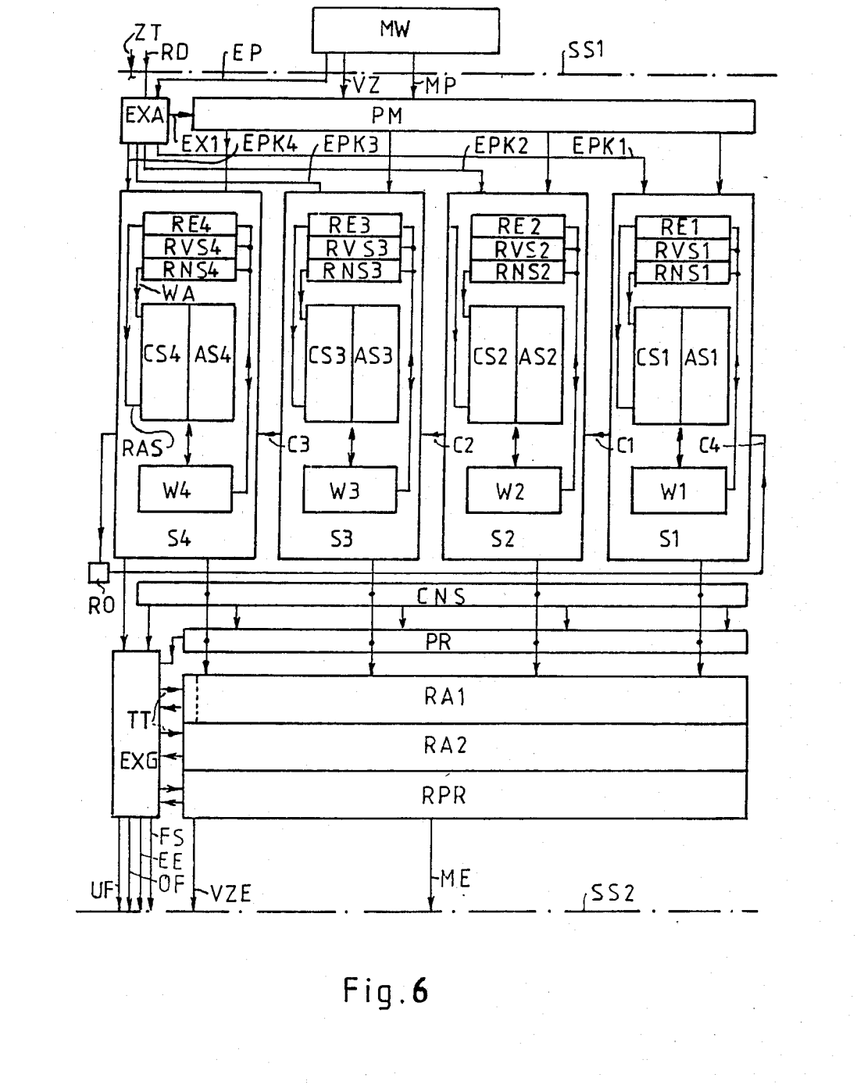
FIG. 6 shows a general drawing of a second embodiment of all the circuitry

FIG. 6 shows an embodiment of the circuitry showing the essential sub-assemblies and their interconnections. The central clock pulse (ZT) and the summands are supplied to the summing unit via an interface (SS1), the multiplication unit (MW) supplying per cycle one exponent (EP), one sign (VZ) and one input mantissa (MP), which are received in an exponent analyser (EXA) and a mantissa positioner (PM) and processed in a first stage, the mantissa being cyclically oriented inside the mantissa positioner (PM) in dependence on the low order exponent digit positions, (EX1) and the higher exponent digit positions, according to the digit position number of the mantissa positioner, are prepared and delivered as exponent codes (EPK1,-EPK4). The operands prepared in this way are supplied in the following cycle to the summing unit sub-assemblies (S1,-S4), in which they occupy three transfer register stages (RE1,-RE4; RVS1,-RVS4; RNS1,-RNS4) and are summed controlledly into the accumulator memory (AS1,-AS4) with intermediate summing of the relevant carries in carry memory sections (CS1,-CS4) by means of the summing unit sections (SW1-SW4). Here, the exponent flags in the transfer registers (RE1, RE4; RNS1,-RNS4) effect the read and write addressing (WA, RAS) of the relevant memory rows.

For a result to be delivered after a plurality of summations all the memory row addresses are delivered successively and controlledly from the exponent analyser (EXA) to all the sub-assemblies (S1,-S4), a flag being supplied to them so that the intermediately stored carries in the memory sections are each summed via carry lines (C1,-C4) to the contents of the same digit position order of the neighbouring sub-assembly and in the case of the module (S4) with the highest order digit positions of a row intermediately stored for one cycle in a carry register (RO), into the sub-assembly "(S1)" with the lowest order contents of the addressed accumulator section with the next address. Thereafter there occurs a continuous carry-over process of individual carries still emerging from sub-assembly to sub-assembly cyclewise within one row and from row to row through the result sections. The partial results, acquired cycle-wise, of the sum are received continuously in the transfer register (RA1, RA2), connected on the output side, until the presence of the highest significant digit position in the second output transfer register (RA2) is detected by the exponent generator (EXG). Thereafter, the result mantissa is brought into the normal position in the result positioner (RPR), possibly completed and rounded from the the contents of the other transfer register (RA1), and a ready signal (FS), a result exponent (EE), possibly an overflow or underflow sign (OF, UF), a result sign (VZE) and a result mantissa (ME) are supplied via the output interface (SS2) to the master computer.

The accumulator subsections and the accompanying carry-over memory sections are arranged according to the digit significance of the contents in rows (ZS1, ZS2 ...) across the sub-assemblies (S1,-S4), so that the rows (ZS1, ZS2...) form superordinated, first sections of the accumulator. The section or row length is measured in such a way that a mantissa can be positioned at will in a row without its beginning and end overlapping in one sub-assembly. In this way, different row addresses arise for the summation in the individual sub-assemblies if a mantissa is positioned and assigned over a row boundary with one part into the next row. This is taken into account by corresponding exponent flags (EPK1,—EPK4). The processing of the mantissa section then occurs, controlled by the relevant exponent flag in the sub-assemblies (S1,-S4) completely independent of each other.

Figure 7:
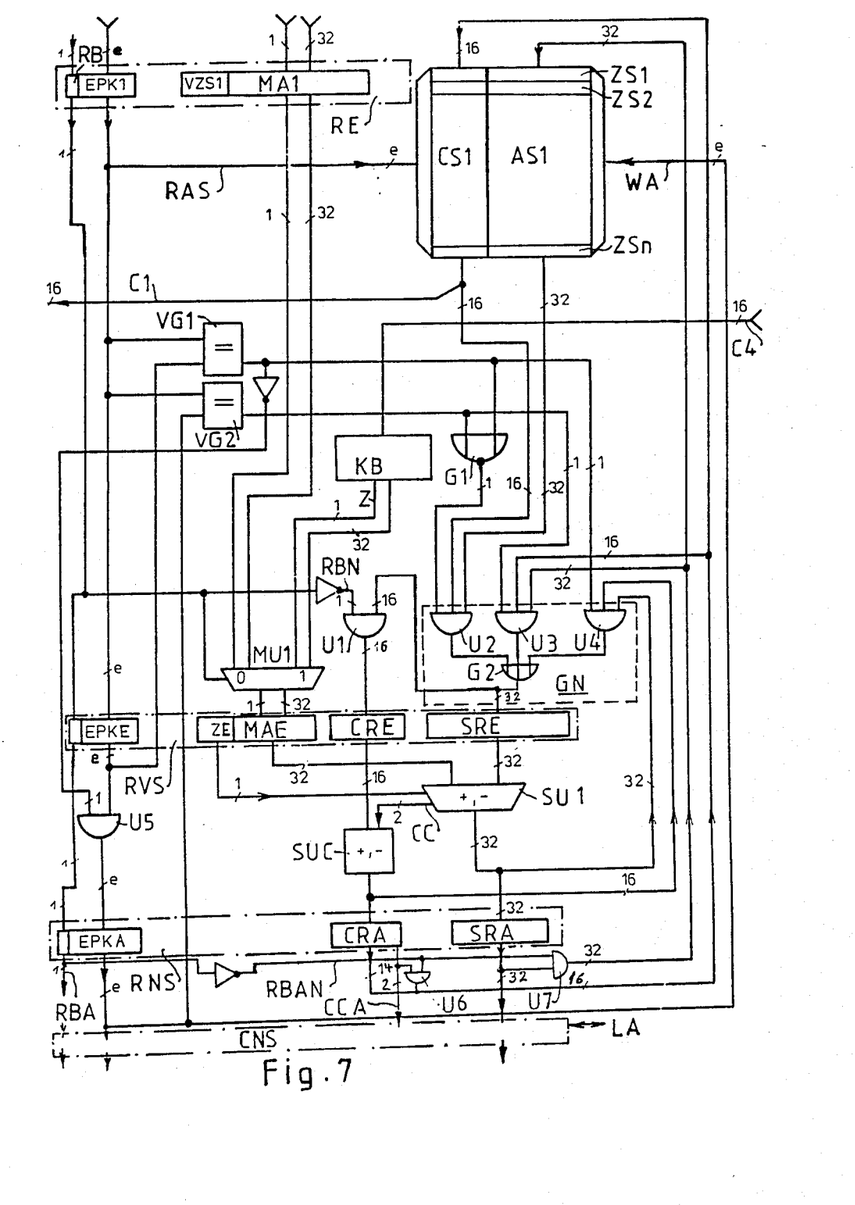
FIG. 7 shows part of a memory and summing unit sub-assembly from the second embodiment

FIG. 7 shows the details of a sub-assembly (S1). The subsections of the accumulator memory (AS1) are contained, together with the carry memory sections (CS1), in a memory (CS1, AS1) to be addressed jointly with the read address (RAS) or write address (WA). Numbers are delivered to the individual connections of the register, memory and gates, which, for instance, denote the line and gate variety. The three transfer register sections (RE, RVS, RNS), which are triggered with the machine clock pulse to take over the input information, are represented in the horizontal position in which the information is transferred temporally connectedly thereto. The sign and the mantissa are taken from the input positioner into the register sections (VZS1, MA1) whence they are delivered to the input side of a multiplexer (MU1), whence they are normally supplied to first input registers (ZE, MAE), whose sign output controls the summing unit (SU1) and whose mantissa outputs are supplied to the first input of the summing unit (SU1). The exponent flag (EPK1) is intermediately stored in the transfer register section (RE), together with a possibly present result and rounding flag (RB), and supplied to the memory (CS1, AS1) as a read address (RAS). The accumulator outputs of the memory lead via a gate selection circuit (GN) through AND- and OR-gates (U2, G2) into a second input register (SRE), whose output is connected with the second summing unit input, and the carry outputs of the memory lead into a carry input register (CRE) which supplies a carry summing unit (SU), into whose other input the ensuing carries (CC)-positive or negative-of the summing unit (SU1) are fed. The outputs of both summing units (SU1, SUC) are connected with output registers (SRA, CRA) whose outputs lead to the write inputs of the memory (CS1, AS1).

The exponent flag is transported with the further clock pulses into a register section (EPKA) of the output transfer register (RNS). There it delivers the write address (WA) to the memory, when the contents of the output registers (CRA, SRA) are written to the memory (CS1, AS1). Furthermore, the outputs of the first and second and the first and third exponent flag registers (EPK1, EPKE; EPK1, EPKA) are each fed into a comparator (VG1, VG2), whose outputs control the transfer paths in such a way when the input signals are equal that each time the same address flag occurs successively the summing unit outputs instead of the memory outputs are connected directly with the input registers (CRE, SRE) via gates (U4, G2) and each time the same address flag occurs next time but one the outputs of the summing unit output register (CRA, SRA) are connected via gates (U3, G2) with the input registers (CRE, SRE) of the summing unit. Moreover, a new flag is prevented from being transferred thereto by input-AND-gates (U5) of the third exponent flag register (EPKA), controlled by the first comparator (VG1), if and as long as the same exponent flag is present in succession. During this time cycle an otherwise unused dummy is written in the memory and the information read from the memory is blocked in AND-gates (U2) by the control signal generated in the NOR-gate (G1).

In this way continuous summations can occur for one and the same memory row, a used read or write process only occurring in this row, however, at the beginning and the end of the sequence. Moreover, such information as it written is not simultaneously read out. In this way apparently extremely fast memory operation is made possible, although this memory is operated in the usual clocked way.

To read out a sum the rounding flag (RB) and cyclewise continuously the exponent flags are supplied continuously from those of the lowest order to those of the highest order. This rounding flag controls change-over of the carry-over process in such a way that the output of the carry-over memory (CS1) delivers the carries (C1) to the adjacent sub-assemblies containing the higher-order digit positions and that the lower-order carries of the other adjacent sub-assembly are directed via a line (C4) by means of a complement evaluator (KB), which splits off the sign (Z) and delivers a magnitude representation, and additionally of a multiplexer (MU1) into the first input register of the summing unit (SU1).

Furthermore, the carrying-over of the carries delivered by the memory (CS1) into the input register (CRE) is prevented by the negated rounding flag (RBN) in the AND-gate (U1), so that only other simple carries (CC) arising during carry processing are delivered via the summing unit (SUC) to two outputs (CCA) in a subsequent carry processing stage (CNS), which consists of a transfer register, half adders and a carry-look-ahead circuit, as shown in FIG. 5, and which picks up the look-ahead signals (LA) of the adjacent sub-assemblies or delivers some thereto and picks up the carry-over signals (CCA) of each lower-order digit position. Re-writing of the single carries (CCA) to the memory is prevented by AND-gates (U6), controlled by the negated rounding flags (RBAN) in the corresponding register (RBA). Similarly, re-writing of the results to the accumulator memory (AS1) is prevented by AND-gates (U7) controlled with the negated rounding flags (RBAN).

Filtering out of the result rows with the highest significant digits and a sufficient number of digit positions of the result mantissa is achieved by a test circuit (PR)-FIG. 6-, which establishes whether the highest digit in the first transfer register (RA1) is a digit of the highest or the lowest digit value, i.e. a sign digit, and whether all the digits due to be tranferred are equal to this digit. In this case further transfer into the register (RA1, RA2) is interrupted. If the above condition is no longer fulfilled, i.e. if an unequal digit is in line, at least two subsequent transfer clock pulses (TT) are supplied to the transfer registers (RA1, RA2) and possibly further clock pulses (TT) until the digits agree once again.

For rounding the test information is evaluated and stored in the exponent generator (EXG), which also controls rounding, which test information provides information as to whether valid digits were present in the low-order partial results transferred out. The generation of the result exponent (EE) is achieved by evaluation of the exponent flag of the highest transferred row and the positioner signal during digit position orientation of the result. The process is represented in the parent application. The test circuit (PR) advantageously uses the overflow connecting signals (LA), which are generated in the overflow processing circuit (CNS).

The number of digit positions given in FIG. 7 are selected from experience. The 16 overflow digits are sufficient for 32 k additions or subtractions of the largest numbers, which virtually never happens. The number of memory rows is, for example, 10, to which a blank row can be added which serves to store blanks.

The number of input and output contacts shown is advantageously further reduced in that the mantissa inputs to the register (MA1) which are unused during result reading serve to supply the carries (C4). The mantissa register (MA4) can then serve to delay and to replace the carry register (RO)-FIG. 6. In the other sub-assemblies (S2;-S4) a by-pass circuit is provided around the mantissa input register. Others of the unused mantissa input contacts can serve to output the carry signals (C1). For this purpose corresonding reversals should be provided in the known way.

Another saving is achieved if the carry summing unit (SUC) is used for the processing of the carries arising during output. A separate summing unit in the carry processing stage (CNS) is then unnecessary. The summing unit (SUC) must then merely be constructed to the same length as the mantissa summing unit (SU1). A controlled path leads the intermediate result through the second summer, to which the carries and propagate signals of the lower-order digit positions are supplied, as shown in FIG. 5. The outputs are then removed from the register (CRA) for further processing.

The allocation of carry pick-up registers and memories (CS1; CRE, CRA) to the accumulator and summing unit sections (AS1; SRE, SRA) and of a carry summing unit section (SUC) to the mantissa summing unit sections (SU1,-SU4) and the subsequent processing of the intermediately summed carries represents an independent invention, which can also be used in combination with other summing unit embodiments shown.

Figure 8:
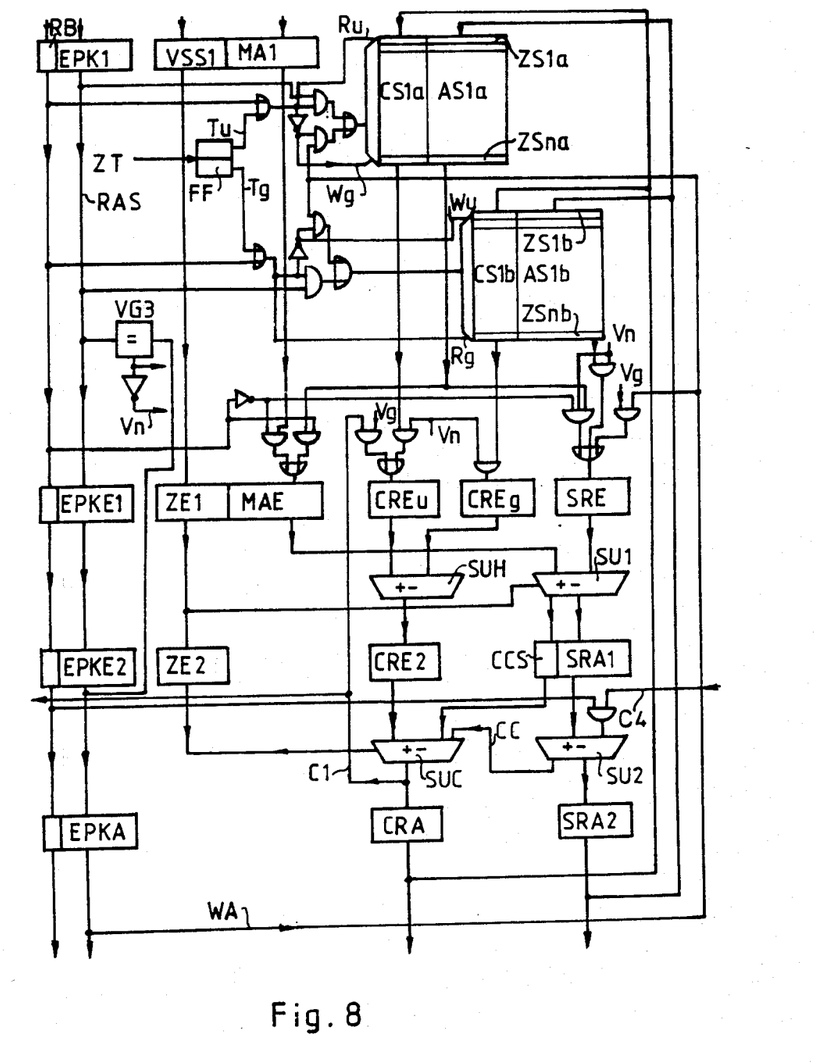
FIG. 8 shows a memory and summing unit sub-assembly from a third embodiment

FIG. 8 shows a third embodiment of the summing unit, which is similar in principle to the second, namely in that it is constructed with an accumulator register (AS1a, AS1b) arranged row-wise in memory sub-assemblies, carry memory sections (CS1a, CS1b) being allocated to each of the row sections (ZS1a, ZS1b) of this accumulator register. These memory sub-assemblies (AS1a, AS1b, CS1a, CS1b) are present in duplicate for each digit position value and are so loaded with write and read signals (Ra, Ru; Wa, Wu) that these are respectively read or written reciprocally according respectively to the read or write addresses (RAS, WA) by the clock pulses (Tu, Tg) appearing alternately from the central clock (ZT) through a divider flipflop (FF). The last letters u or g in the reference numerals denote the activity in the odd- or even-numbered clock cycle. Identical sub-assemblies and signals are given the same reference numerals in FIGS. 7 and 8; this particulary affects the input and output registers and signals.

The control signals and accompanying data pass through four transfer registers in all, before the intermediate result is written, so that each time one cycle time is used for reading an accumulator memory row (ZS1a, -ZSna; ZS1b, -ZSnb), summation of the mantissa (MAE) in the summing unit (SU1), and of carry summation registers (CRE2, CCS) in the carry summing unit (SUC) and writing into the memory row. Since the carry processing occurs in a separate cycle time, even higher cycle speeds can be achieved than with the simultaneous processing according to FIG. 7 if the same technology is used. The control and flag registers (EPKE1, EPKE2; ZE1, ZE2) needed for summations are characterized by the end digits 1 and 2 respectively, which indicate the cycle sequence.

If the same address is to be read again successively in the same memory, i.e. in the next-but-one cycle, a fact which would be detected by the comparator (VG3), the sum is taken instead from the sum register (SRA1) and the carry summer (SUC) into the input register (SRE, CREu), the path through the memory being dropped. For reversal suitable gate combinations are provided at the register inputs, these being controlled by the comparator signals (Vg, Vn). It is also possible for comparison and reversal of the operands to be effected one cycle later in the next transfer register stages and for the gates to placed there.

Provided that the rounding and result read-out process is predetermined by the rounding control signal (RB), both memories are read out continuously, row-wise and in parallel by corresponding gate control and memory activation and the contents are transferred into the operand input registers (SRE, MAE; CREu, GREG). In each successive cycle the summation of the partial results occurs in the summing unit (SU1) and of the accompanying carries in an auxiliary summing unit (SUH). The intermediate results are then in the transfer registers (SRA1, CRE1). In each successive cycle the carries (C4) arriving from the lower-order accumulator section are summed in a second summing unit (SU2) and delivered to the output register (SRA2). The carries (CC, CCS) arising at this point are summed to the carries in the intermediate carry memory (CRE2) and the carry result is delivered as an outgoing carry (C1) to the sub-assembly of higher digit value.

The arrangement structure of the sub-assembly, which is shown in the drawing from top to bottom according to the time sequence, is appropriately so constructed that the register sections (EPK1, EPKE1, EPKE2, EPKA) containing the addresses are arranged directly at the edge of the memory zone. Separate address register sections for the memory may also be present, which are loaded in turn with an address by the exponent analyser, this being within the capability of one skilled in the art.

We claim:

1. Circuitry for generating sums, especially scalar products, comprising a summing unit having an input and an output wherein:

A(i) said summing unit is connected on its input side to a multiplication unit which delivers per machine cycle one product in a floating point representation consisting of a product mantissa, a product sign and a product exponent, (a) an exponent controlled mantissa positioner and transfer register rows, said product mantissa and product sign being fed through said exponent controlled mantissa positioner to a first row of said arrangement of transfer register rows operated in equal machine cycles for a column-wise transfer;

(b) an exponent analyzer, said product exponent being fed to said exponent analyzer, output signals of which are controlling said mantissa positioner and further output signals of which are fed to the first row of said transfer register arrangement for digit value-wise summation of the corresponding product mantissa; and A(ii) a rounding flag line having an input, said summing unit being connected further on its input side to said rounding flag line; and (iii) a result positioner and an output interface, said summing unit being connected on its output side via said result positioner to said output interface, to deliver a result sign and a controlled rounded mantissa; and A(iv) an exponent generator, said summing unit being connected on its output side further via said exponent generator to said output interface, to deliver a result exponent and at least one of a plurality of status flags generated by said summing unit;

B(i) said summing unit further comprising an accumulator register the length of which corresponds at least to the length of the product mantissa elongated by the difference between the largest product exponent and the smallest product exponent;
(a) said accumulator register comprising accumulator register sections; and B(ii) said summing unit further comprising said arrangement of transfer register rows, each of which transfer register rows comprises transfer register parts and each of said transfer register parts comprises:
(a) a mantissa transfer register part and
(b) a control unit and control signal transfer register parts, these control signal transfer register parts delivering control signals to said control unit;

B(iii) said summing unit comprising further a summing circuitry comprising summing circuitry parts having carry inputs and outputs; and B(iv) said summing unit comprising further carry memory sections and a carry register comprising carry register parts having inputs and outputs;

C said control unit responsive to said control signals of each of the control signal transfer register parts and the respective row and column position of the corresponding transfer register part containing the accompanying product mantissa part controlling:

C(i) the column-wise connection of the said transfer register rows; and

C(ii) the connection of the outputs of the said mantissa transfer register parts with the inputs of said summing circuitry parts; and C(iii) the connection of said summing circuitry parts with the accumulator sections; and C(iv) the connection of the outputs of the said accumulator sections to the inputs of the said mantissa transfer register parts; and C(v) the connection of said carry outputs of the said summing circuitry parts to said inputs of the said carry register parts and of said outputs of the said carry register parts to said carry inputs of the said summing circuitry parts, so that a digit value-wise summation occurs into these accumulator register sections, the carries arising during section-wise summation being intermediately stored in the carry memory sections, which are arranged with the accumulator register sections in one of the accompanying transfer register rows or memory rows;

D. the control unit being connected to the rounding flag line at its input side and, responsive to the status of said rounding flag and the said control unit, controls that the content of said accumulator sections and the content of the said carry register parts and said carry memory sections are summed by said summing circuitry parts digit position-wise and outputted clock-wise.

2. Circuitry according to claim 1 wherein:

A. the summing unit is divided into row sections, each row section comprises an accumulator register section, a summing circuitry section and a transfer register row;

B.(i) the exponent analyser generates a lower exponent part which controls the cyclic position control of the mantissa positioner; and B.(ii) the exponent analyser further generates an upper exponent part and a flag which are fed to the input of the control transfer register part of the first transfer register row, this input fed flag indicates the position of a part of the product mantissa positioned cycle-wise beyond the row boundary and which flag is evaluated in the control unit in such a way that in each row:

(a) a comparison between a row position identification signal and the upper exponent part currently contained in the control signal transfer register part is performed, and when equality arises in said comparison the summation is effected by the flag from the accompanying mantissa transfer register part into the accompanying accumulator register section, whereby that part of the product mantissa, which has not been positioned beyond the row boundary is summed; and (b) a comparison between the next row position identification signal and the upper exponent part currently contained in the control signal transfer register part is performed, and when equality arises in said comparison the summation is effected from the accompanying accumulator register section, whereby the remaining part of the product mantissa which has not been positioned beyond the row boundary is summed.

3. Circuitry according to claim 2, wherein the accumulator register sections are each connected to respective output transfer register sections under the control of a result read-out signal.

4. Circuitry according to claim 2, wherein the mantissa positioner is a multiple multiplexer, in front of which there is arranged an input register and whose number of inputs is equal to the number of bit positions of the product mantissa and whose number of outputs is equal to the number of inputs of the mantissa transfer register of the first row.

5. Circuitry according to claim 4, wherein the mantissa positioner is subdivided into positioner sub-assemblies which are allocated to the individual bit values of digit positions of the product mantissa.

6. Circuitry according to claim 5 wherein the positioner sub-assemblies are sub-divided into positioner sub-groups being equal in structure and whose number of inputs is equal to the number of digit positions of the product mantissa and whose number of outputs is equal to half or a total fraction of the number of digit positions of the product mantissa.

7. Circuitry according to claim 6 wherein the input connections of the individual positioner sub-assemblies are each connected to a mantissa positioner input register, said input connections being staggered cyclically in relation to each other positioner sub-assemblies input connections by a number of positions corresponding to the number of digit positions of the first output position of the said positioner sub-assembly.

8. Circuitry according to claim 2, wherein the individual rows are subdivided into transfer register section sub-assemblies and into separate summing unit section sub-assemblies of said summing unit section sub-assemblies contain the control unit section, the summing unit section and the accumulator section, and further each of the said transfer register section sub-assemblies contain controls signal register sections possessing input contacts and output contacts which are each interconnected in columns from said output contacts to said input contacts by column connections, and the summing unit section sub-assemblies possessing combined input and output connections connected alternatively with the summing unit inputs or the summing unit outputs, which said combined input and output connections are each connected in a wired OR-circuit with the appropriate column connection.

9. Circuitry according to claim 8, wherein in each row a control signal transfer sub-assembly is connected with two control units of adjacent summing unit section sub-assemblies.

10. Circuitry according to claim 8, wherein the number of rows is 10 and the length of the rows is 32 digit positions, each row being divided into 4 equal sub-assemblies.

11. Circuitry according to claim 8, wherein the number of rows is 10 and the length of the rows is 32 digit positions, each row being divided into several transfer register sub-assemblies and two summing unit section sub-assemblies.

12. Circuitry according to claim 2, wherein the number of rows is 8 and the row length is 40 digit positions, each row being subdivided into 5 equal sub-assemblies.

13. Circuitry according to claim 2 wherein the individual rows are sub-divided into summing unit sub-assemblies which each contain:
 A. one or more mantissa transfer register sections and an equal number of allocated summing unit sections and accumulator sections;
 B. one of the control signal transfer register parts with the accompanying control unit, which generates,
  (i) from signals of the control signal transfer register with the upper exponent part of a rounding signal, and
  (ii) with the identification signal part and a sign part and the row position identification signal, the summing control signals and a result read-out signal which controllingly connects the outputs of the summing unit sections column-wise with inputs of the transfer register sections and erases the contents of the accumulator sections.

14. Circuitry according to claim 13, comprising a status bit signal, which signals the presence of the highest digit value in the highest result position, wherein the result read-out signal carries over said status bit signal into the sign part of the control signal transfer register, and further comprising an encoding circuit, which determines from the summing unit signals, the position of the highest digit position, whose content is different from zero or from the highest digit, the said result read-out signal carries this position information controllingly to a control signal transfer register part.

15. Circuitry according to claim 14, wherein the exponent generator is connected to a rounding control signal line of an input register of the result positioner, and under control of said rounding control signal, the exponent generator counts the cycle pulses into a counter as long as said input register contains all zeros or all the highest order digits, thus counting the number of the rows being carried over into the said input register, and further the exponent generator is connected to all digit positions of said input register by encoding means, which encoding means deliver the digit number of those higher-order digit positions which contain zero or the highest-order digit, and to which encoding means a control signal generating means is connected generating from said digit number a positioner control signal and delivering said control signal to the result positioner, and further the exponent generator contains composing means, which composes said counted row numbers and said digit member, thus generating a result exponent signal, which result exponent is fed to an upper limit comparator and a lower limit comparator, which said comparators are delivering the overflow signal or the underflow signal.

16. Circuitry according to claim 15 wherein the output signals of the result positioner are coupled on the input side to a rounding summing unit:
 A. whose length is longer than the length of the result mantissa by at least two digit positions, i.e. one overflow and one rounding position;
 B. to which the positioned mantissa part is fed from the row with the unequal digit of the highest-order; and
 C. to which in the subsequent machine cycle the result mantissa part displaced beyond the row boundary is fed positioned by the same number of digit positions;
 whereafter the rounding and an overflow control and possibly a position correction of the highest-order mantissa position occur controlledly.

17. Circuitry according to claim 16, wherein the mantissa positioner sub-assemblies and the result positioner sub-assemblies are of identical structure.

18. Circuitry according to claim 16, wherein the product summing unit and the result summing unit are of identical structure.

19. Circuitry according to claim 16, wherein a carry-look-ahead circuit is connected to each accumulator register section, which carry-look-ahead circuit delivers an increasing carry-look-ahead signal when the contents of the accumulator register section are of the highest possible order and an increasing carry and/or an increasing look-ahead signal enters or when the contents of the accumulator section are lower by one than the highest possible value and an increasing carry and an increasing look-ahead signal enter and which delivers a decreasing carry-look-ahead signal when the accumulator register content is zero and a decreasing carry and/or decreasing look-ahead signal enters or when the content of the accumulator section is one and a decreasing carry and a decreasing look-ahead signal enter, and that the entering look-ahead signals and the enter carrying signals are conveyed independantly of each other to the summing unit section.

20. Circuitry according to claim 13, wherein the summing unit sub-assembly contains an output register for carry control signals, to which with each machine cycle optionally a positive or negative carry and a zero (i.e. logic zero) or none-zero (i.e. logic 1) signal is supplied, and the summing unit sub-assembly contains a carry processing unit to which the carry control signals of the summing sub-assemblies are supplied, from the lower-order position in the adjacent row, and which according to carry logic conveys one carry to the summing unit section.

21. Circuitry according to claim 20, wherein a carry signal is conveyed to each summing unit section when an overflow signal of lower-order positions is present and the propagate signals of all the higher-order positions are transmitted as far as the respective summing unit section and that the carry control signals are only stored in the output register when a propogate signal and a carry signal are not present in the relevant sub-assembly.

22. Circuitry according to claim 21, wherein two or more column-wise related row sections are united in one summing unit sub-assembly.

23. Circuitry according to claim 1, wherein the accumulator sections are arranged in the rows of a memory which allows simultaneous reading and writing of different, seperately addressed memory rows, and that the control signal transfer sections supply the read and write addresses to the memory, and in each memory row carry memory sections are arranged whose capacity is so measured that all overflows of all partial summations of a sum generation arising in the respective accumulator section are received therein, and a final carry summation in which cycle-wise reading-out of the summation result from the memory sections occurs in succession from the memory section content of lowest significance to that of highest signigicance, the contents of one carry memory section being summed to the contents of the same digit position value of the next accumulator memory section, whereafter there occurs a continuous carry-over process of single carries still appearing between the sum sections generated.

24. Circuitry according to claim 23, wherein the row sections are divided into subsections in memory sections subdivided into columns and the complete length of a row is that of the length of a mantissa and a subsection and each memory section has allocated to it a transfer register arrangement, a summing unit section and a carry summing unit.

25. Circuitry according to claim 24, wherein in the transfer register arrangement, the summing unit section and the carrying summing unit which are allocated to one of the memory sections form one sub-assembly.

26. Circuitry according to claim 24, wherein comparators are connected in pairs downstream of the control signal transfer register parts, the outputs of which comparators, when the contents of the first and second register parts are equal, effect a feedback of the summing unit outputs to its input register and an inhibition of the read memory content and an inhibition of the transfer of the register content from the second control signal transfer register to the output control signal transfer register and that when the contents of the first and third registers are equal, a feedback of the contents of the outputs of the summing unit output register to the summing unit input register and an inhibition of the memory information read are effected.

27. Circuitry according to claim 26, wherein transfer of the output signals of the carry memory to the one of the summing unit input registers of the sub-assembly with the digit positions of the next higher-order is effected by a result output flag in the transfer registers, the carry signal lines being conveyed from the sub-assembly with the highest digit positions via a one-stage carry register into the sub-assembly with the lowest digit positions.

28. Circuitry according to claim 27, wherein the signal line of the lowest digit position sub-assembly is conveyed to the mantissa transfer register to delay carry-over and with the other sub-assemblies is conveyed past the mantissa transfer register.

29. Circuitry according to claim 27, wherein the result output flag inhibits memory rewriting and controls processing of the carries, which arise during carry summation, along the sub-assemblies by means of a carry-look-ahead and processing circuit.

30. Circuitry according to claim 29, wherein one of the inputs of the carry summing unit is connected, under the control of the result output flag, with the output of the summing unit output register and the other input has delivered to it the carries of the lower-order digit positions combined with the carry-look-ahead signals and the output of the output register is conveyed from the carry summing unit for subsequent processing.

31. Circuitry according to claim 23, wherein the row-wise result parts are delivered in increasing value through a test circuit to two output transfer registers, the test circuit detecting whether the highest digit position of the first transfer register contains a highest or lowest digit and the digits due for transfer are equal thereto and if necessary inhibits further transfer to the transfer register until the digits are unequal, whereupon at least two transfer signals are delivered for transfer and further transfer signals are delivered until digit equality is once again present in the test circuit.

32. Circuitry according to claim 31, wherein in the exponent generator, which controls rounding, the signals of the test circuit are evaluated which indicate the presence of valid digits in the result parts, which are transferred out of the two transfer registers.

33. Circuitry according to claim 23, wherein each summing unit section has allocated to a carry summing unit section and each accumulator section has allocated to it a carry memory section and after the result sections have been read from the accumulator sections the intermediately stored carries are each summed digit position-wise to these result sections.

34. Circuitry according to claim 1, wherein the accumulator memory sections and the accompanying carry memory sections are present in duplicate for each digit position value and are arranged in separate memories in the memory rows, which are read or written temporally alternatingly in reverse order, as long as the products are continuously summed, the addressing of the memory rows occuring alternatingly through the control signal transfer register sections, and that when the rounding flag is present both memories are continuously addressed and simultaneously read row-wise and their contents, including the carries, are summed and output digit position-wise.

35. Circuitry according to claim 34, containing four transfer register rows, whose control signals control, cycle-wise and in succession, mantissa transfer and memory readin into operand registers, summation of the mantissa, carry summation and finally sum and carry storage, and that by comparing the appearance of the same memory row address in one cycle after the other control signals are generated which control the feedback of the sums and carries generated into the operand registers.

36. Circuitry according to claim 35, wherein when the rounding flag is present, the summation of the contents of each of the two memory sections with identical positions takes place in a first clock cycle time in the accompanying summing unit section and for the carries in an auxiliary summing unit section and in the following cycle time the digit position-wise summation of the carries takes place from summing unit section to summing unit section in other summing unit sections and carry summing unit sections.

* * * * *